United States Patent
Horiike et al.

(10) Patent No.: US 6,913,426 B2
(45) Date of Patent: Jul. 5, 2005

(54) THROWAWAY INSERT

(75) Inventors: Nobukazu Horiike, Tsukuba (JP); Jun Kitajima, Tsukuba (JP); Hiroshi Shimomura, Tsukuba (JP); Koichi Ikenaga, Moriya (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 10/443,913

(22) Filed: May 21, 2003

(65) Prior Publication Data
US 2003/0219320 A1 Nov. 27, 2003

(30) Foreign Application Priority Data
May 24, 2002 (JP) ........................................ 2002-151228

(51) Int. Cl.[7] .............................................. B26D 1/00
(52) U.S. Cl. ...................... 407/113; 407/114; 407/115; 407/116; 407/42
(58) Field of Search ................................. 407/113, 114, 407/115, 116, 42

(56) References Cited

U.S. PATENT DOCUMENTS

| | | | |
|---|---|---|---|
| 4,087,192 A | * | 5/1978 | Hertel .......................... 407/114 |
| 4,248,553 A | * | 2/1981 | Kraemer ....................... 407/114 |
| 4,834,591 A | | 5/1989 | Tsujimura et al. |
| 4,984,642 A | | 1/1991 | Renard et al. |
| 5,221,164 A | * | 6/1993 | Allaire ........................ 407/113 |
| 5,688,081 A | | 11/1997 | Paya |
| 5,772,365 A | | 6/1998 | Vogel et al. |
| 5,967,710 A | | 10/1999 | Krenzer |
| 6,024,519 A | | 2/2000 | Okui et al. |
| 6,102,630 A | | 8/2000 | Flolo |
| 6,149,355 A | | 11/2000 | Fouquer et al. |
| 2002/0159846 A1 | | 10/2002 | Horijike et al. |

FOREIGN PATENT DOCUMENTS

| | | | |
|---|---|---|---|
| EP | 0 504 608 A1 | 9/1992 | |
| JP | 11-500670 | 1/1999 | .............. B23C/5/10 |
| WO | WO-96 30150 A1 | 10/1996 | |

* cited by examiner

Primary Examiner—Willmon Fridie, Jr.
(74) Attorney, Agent, or Firm—Darby & Darby

(57) ABSTRACT

A throwaway insert enables reduction in cutting force and improves chip separation ability without sacrificing the strength of cutting edge thereof. An upper face of the throwaway insert is provided with an undulating portion, which is formed by alternately arranged concave portions and convex portions, so as to provide a wavy shape to the cutting edge. The undulating portion comprises four concave portions, i.e., a first deep-concave portion, a first shallow-concave portion, a second deep-concave portion, and a second shallow-concave portion. The first deep-concave portion and the second deep-concave portion are located so that effective cutting region of the cutting edge is divided into three portions having lengths substantially equal to each other, and the second deep-concave portion is made deeper than the first deep-concave portion.

8 Claims, 6 Drawing Sheets

THROWAWAY INSERT

BACKGROUND OF THE INVENTION

1. Field of the Invention

The present invention relates to a throwaway insert which is attachable to an indexable type ball nose end mill or the like.

2. Background Art

An example of such a throwaway insert which is attachable to an indexable type ball nose end mill is disclosed in Published Japanese Translation No. Hei 11-500670 of the PCT International Application.

The throwaway insert comprises a cutting edge which is formed substantially as an arc of a quarter circle along a ridge between an upper face and a side face, and which includes a plurality of sinusoidal portions so as to reduce cutting force, and so as to improve ability to break and remove chips produced from a workpiece.

In the sinusoidal cutting edge, all concave portions and all convex portions exhibit the same depth and the same height, respectively, i.e., the cutting edge exhibits a wavy shape having a constant "amplitude" over the entire length.

When cutting of a workpiece is performed using the throwaway insert having the wavy cutting edge in a so-called "downward cutting manner" in which the axis of rotation is directed horizontally, and cutting is performed downwardly so that a cut chip has a greater thickness at the beginning of cutting than at the end of cutting, the cutting operation can be easily performed with relatively low cutting force, and chips are easily separated so that sufficient chip dischargeablity is maintained.

However, when cutting of a workpiece is performed in a so-called "upward cutting manner" in which the axis of rotation is directed horizontally, and cutting is performed upwardly so that a cut chip has a smaller thickness at the beginning of cutting than at the end of cutting, because, in this case, the thick portions of the chips at the end of cutting tend to be compressed so that the chips may not be preferably separated and may be produced continuously; therefore, sufficient chip dischargeablity may not be obtained.

In order to ensure separation of chips even when cutting is performed in an "upward cutting manner", the depths of the concave portions, which form the wavy cutting edge, may be made greater. In this case, separation of chips can be ensured; however, the wavy cutting edge exhibits a large "amplitude" because the cutting edge is formed so as to exhibit a wavy shape having a constant "amplitude" for all concave portions and convex portions, and as a result, the strength of the cutting edge may be unexpectedly decreased. Therefore, increasing the depths of the concave portions may not be an effective solution.

SUMMARY OF THE INVENTION

Based on the above circumstances, an object of the present invention is provide a throwaway insert which enables reduction in cutting force, and which enables stable separation of cut chips without sacrificing the strength of the cutting edge unexpectedly.

In order to achieve the above objects, the present invention provides a throwaway insert comprising a bottom face as a mounting face; an upper face opposing the bottom face, a side face formed between the bottom face and the upper face, and a cutting edge formed along an intersecting ridge between the upper face and the side face in a substantially arc shape such that the rotational trace of the cutting edge when being attached to a tool body in use substantially forms a partial spherical surface, wherein an undulating portion, which is formed by alternately arranged concave portions and convex portions, is provided on the upper face so as to intersect the cutting edge, and so as to provide a wavy shape to the cutting edge, and wherein at least one of the concave portions is formed as a deep-concave portion which has a greater depth than that of the others.

According to the above configuration, because the cutting edge formed along the intersecting ridge between the upper face and the side face has a wavy shape, the sections of the cutting edge respectively corresponding to the concave portions and the convex portions begin to bite a workpiece asynchronously, and as a result, cutting force is reduced.

In addition, because at least one of the concave portions, which form the undulating portion, is formed as a deep-concave portion which has a greater depth than that of the others, not only is cutting force reduced but also a stable chip separation effect can be ensured due to the deep-concave portion. Accordingly, it is possible to ensure an effect of chip separation just by setting the depth of the deep-concave portion appropriately even when cutting is performed in a manner, e.g., an upward cutting manner, in which chips are not easily separated, while on the other hand, sufficient strength of the cutting edge is maintained since other concave portions do not have to be made deep.

In the throwaway insert of the present invention, the concave portions and the convex portions may be formed by curved surfaces.

According to the above configuration, because the cutting edge formed along the intersecting ridge between the upper face and the side face is configured by curves, sufficient strength of the cutting edge can be ensured.

In the throwaway insert of the present invention, each of the concave portions and each of the convex portions may extend in a direction substantially perpendicular to the cutting edge so as to intersect the cutting edge.

According to the above configuration, because stable undulation is provided over substantially the entire length of the cutting edge, an effect of reduction in cutting force and an effect of chip separation can be stably obtained even when any portion of the wavy cutting edge that is formed along the intersecting ridge between the upper face and the side face actually contributes to cutting.

In the throwaway insert of the present invention, the deep-concave portion may be located so as to divide a portion of the cutting edge, which actually contributes to cutting a workpiece, into a plurality of portions having lengths substantially equal to each other.

According to the above configuration, because each of the chips produced by a portion of the cutting edge that actually contributes to cutting a workpiece is divided into a plurality of portions having lengths substantially equal to each other, sufficient chip dischargeablity can be maintained.

The throwaway insert of the present invention may comprise a plurality of deep-concave portions, and the depths of the deep-concave portions may be increased stepwise as the distance from a tip portion of the cutting edge increases.

The thickness of a chip that is produced by the rounded cutting edge is increased as the distance from the tip portion of the cutting edge increases due to an effect of feed in a direction perpendicular to the axis of a tool body. According to the above configuration, because a sufficient depth corresponding to the thickness of the produced chips is applied to respective concave portions, a superior chip separation effect can be ensured while maintaining strength of the cutting edge.

In the throwaway insert of the present invention, the depth of the deep-concave portion at the cutting edge, as viewed in a direction along which the concave portions and convex portions extend, while viewing the side face, may be set in a range from 1.2 to 3.0 mm.

If the deep-concave portion is made too shallow, a sufficient chip separation effect due to the deep-concave portion may not be obtained. On the other hand, if the deep-concave portion is made too deep, strength of the cutting edge in the vicinity of the deep-concave portion may be decreased.

When the depth of the deep-concave portion at the cutting edge is set in a range from 1.2 to 3.0 mm according to the present invention, chips can be stably separated without sacrificing the strength of the cutting edge.

In the throwaway insert of the present invention, the depths of the concave portions at the cutting edge other than the deep-concave portion, as viewed in a direction along which the concave portions and convex portions extend, while viewing the side face, may be set in a range from 0.3 to 1.2 mm.

If the concave portions (shallow-concave portions) at the cutting edge other than the deep-concave portion are made too shallow, an effect of reduction in cutting force due to the shallow-concave portions may not be obtained. On the other hand, if the shallow-concave portions are made too deep, strength of the cutting edge in the vicinity of the shallow-concave portions may be decreased.

When the depths of the concave portions at the cutting edge other than the deep-concave portion is set in a range from 0.3 to 1.2 mm, chips can be stably separated without sacrificing the strength of the cutting edge.

In the throwaway insert of the present invention, the distance between the bottoms of the concave portions adjacent to each other at the cutting edge, as viewed in a direction along which the concave portions and convex portions extend, while viewing the side face, may be set in a range from 2.0 to 10.0 mm.

If the distance between the bottoms of the concave portions adjacent to each other is too small, the cutting edge formed along the side edge of the upper face exhibits a dense-wavy shape. On the other hand, if the distance between the bottoms of the concave portions adjacent to each other is too large, the cutting edge formed along the side edge of the upper face exhibits a moderate-wavy shape. In either cases, an effect of reduction in cutting force and an effect of chip separation may not be obtained.

When the distance between the bottoms of the concave portions adjacent to each other at the cutting edge is set in a range from 2.0 to 10.0 mm according to the present invention, cutting force can be stably reduced, and chips can be preferably separated.

In the throwaway insert of the present invention, the distances between the bottoms of the concave portions adjacent to each other at the cutting edge, as viewed in a direction along which the concave portions and convex portions extend, while viewing the side face, may be set substantially to be equal to each other.

According to the above configuration, in the case of using, for example, a two-insert type ball nose end mill provided with the throwaway inserts of the present invention, two throwaway inserts can be disposed in such a manner that rotational traces of the concave portions of one throwaway insert substantially coincide with rotational traces of the convex portions of the other throwaway insert, and rotational traces of the convex portions of one throwaway insert substantially coincide with rotational traces of the concave portions of the other throwaway insert.

Accordingly, even when cutting traces are made in a machined surface of a workpiece by cutting edge of one throwaway insert, degradation of surface roughness of the machined surface of the workpiece can be prevented by, for example, disposing two throwaway inserts in a manner described above.

In the throwaway insert of the present invention, a portion of the upper face in the vicinity of a tip portion of the cutting edge may be made as an inclined surface such that the distance between the upper face and the bottom face decreases as the distance from the tip portion of the cutting edge decreases, and the undulating portion may be formed on a section of the upper face other than the inclined surface.

According to the above configuration, the included angle of the tip portion of the cutting edge, to which a great cutting load is applied due to lower peripheral speed, can be made large. In addition, because the undulating portion is not formed on the inclined surface where the throwaway insert is less thick, rigidity of the throwaway insert will not be decreased.

DETAILED DESCRIPTION OF THE PREFERRED EMBODIMENTS

A throwaway insert according to an embodiment of the present invention will be explained below with reference to the appended drawings.

Figure 1:
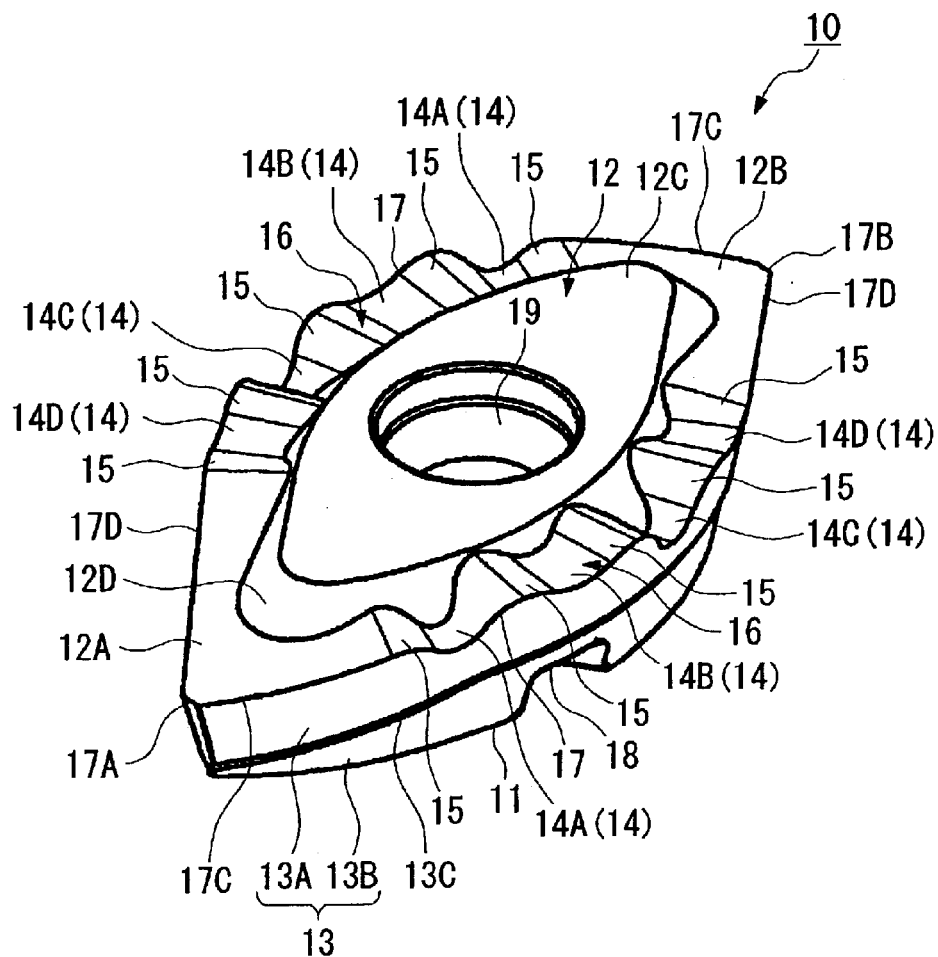
FIG. 1 is a perspective view showing a throwaway insert according to an embodiment of the present invention.
Figure 5:
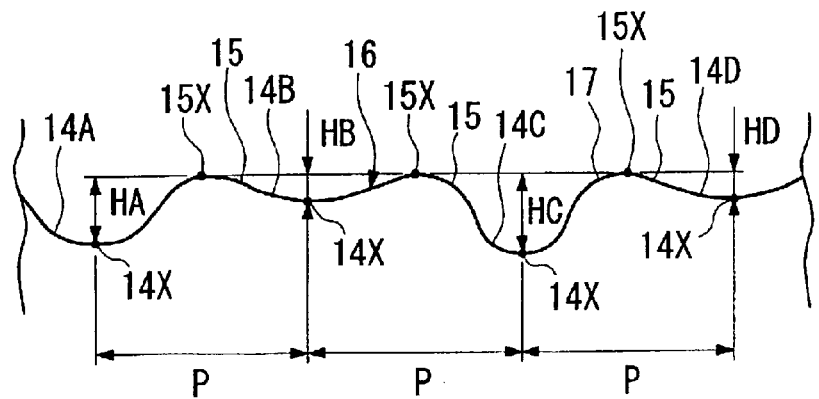
FIG. 5 is a diagram illustrating the shape of the cutting edge of the throwaway insert of the embodiment.
Figure 2:
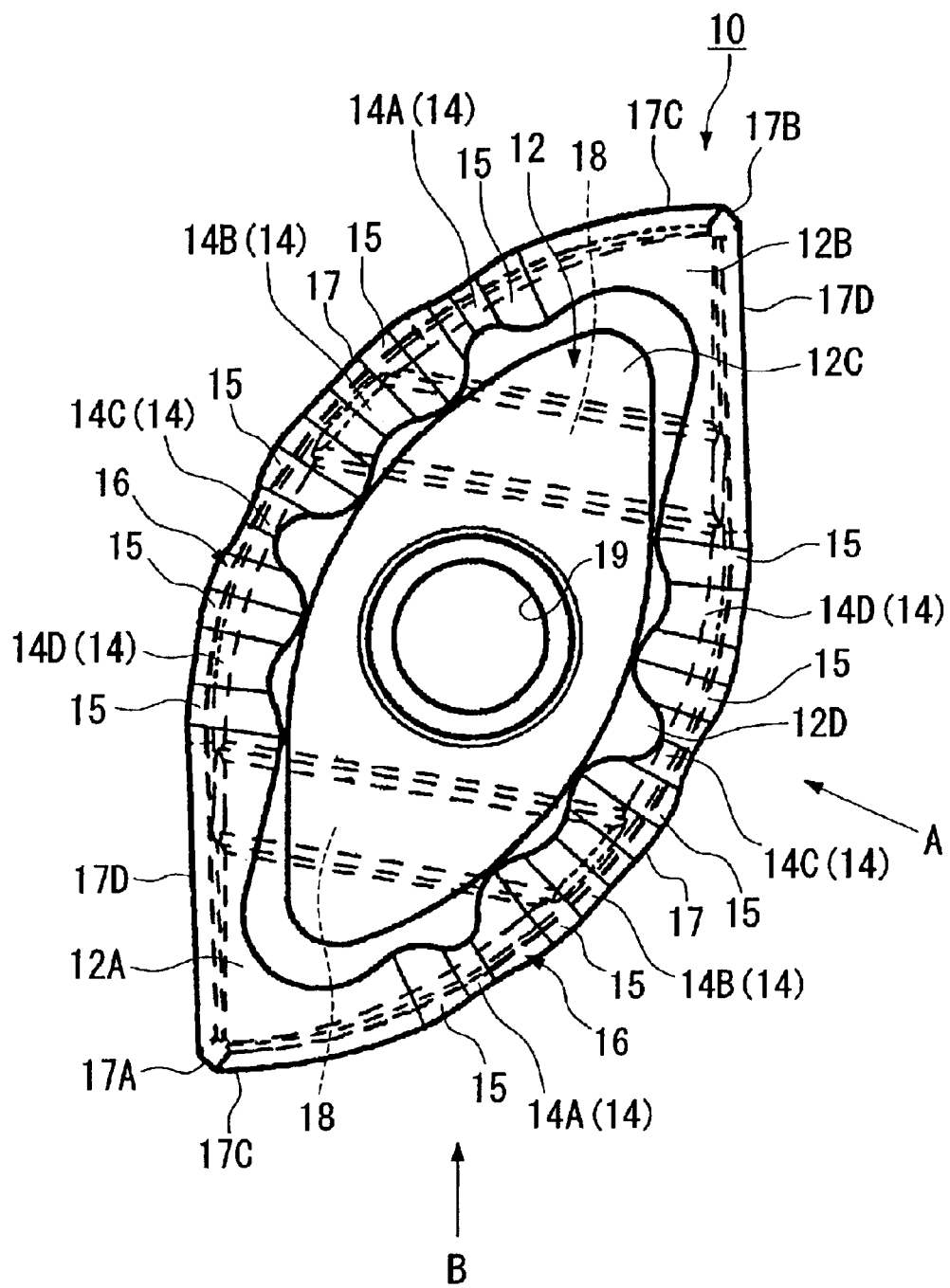
FIG. 2 is a plan view showing the throwaway insert of the embodiment.
Figure 3:
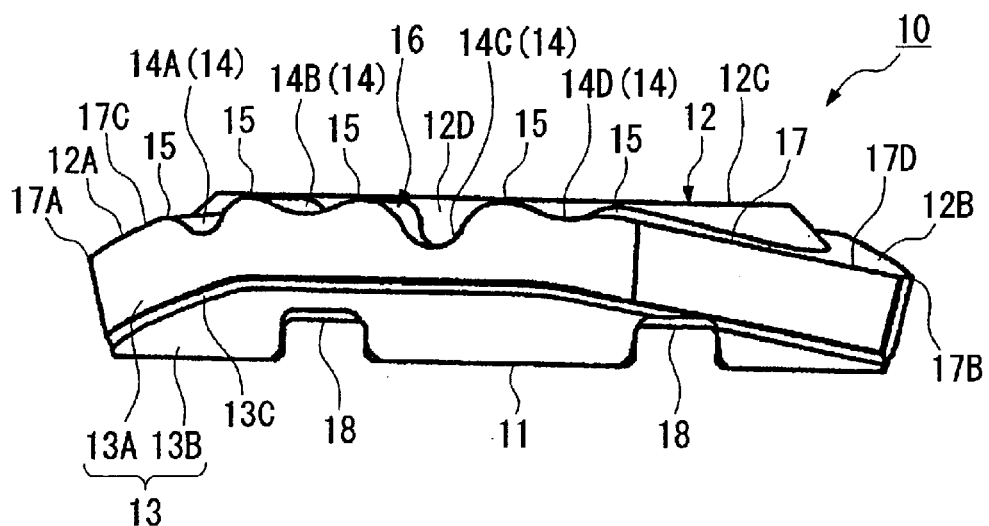
FIG. 3 is a side view showing the throwaway insert as viewed in the direction indicated by the arrow A in FIG. 2.
Figure 4:
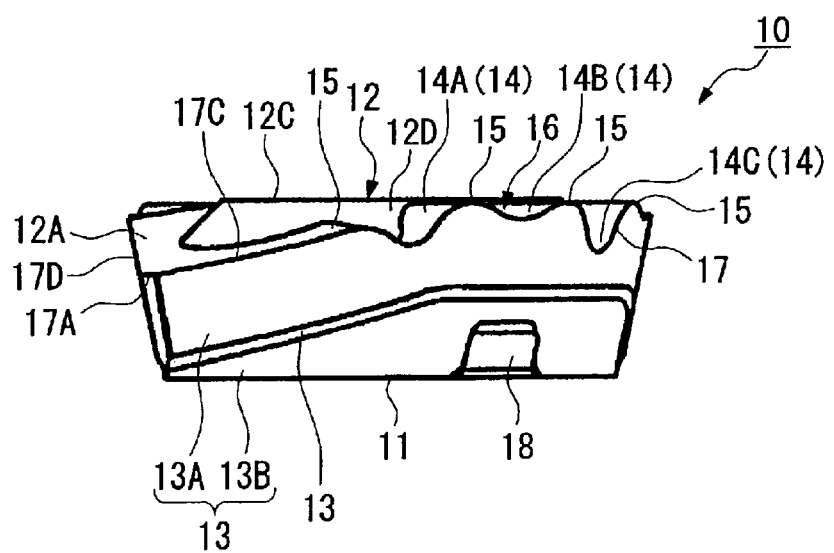
FIG. 4 is a side view showing the throwaway insert as viewed in the direction indicated by the arrow B in FIG. 2.

FIG. 1 is a perspective view showing the throwaway insert according to the embodiment of the present invention, FIG. 2 is a plan view showing the throwaway insert, FIG. 3 is a side view showing the throwaway insert as viewed in the direction indicated by the arrow A in FIG. 2, FIG. 4 is a side view showing the throwaway insert as viewed in the direction indicated by the arrow B in FIG. 2, FIG. 5 is an imaginary diagram illustrating the shape of the cutting edge of the throwaway insert by deforming the cutting edge in a plane.

The throwaway insert 10 of the present embodiment is made of hard material such as cemented carbide or the like, and is formed like a plate having a leaf shape as shown in FIGS. 1 to 4. The throwaway insert 10 comprises a bottom face 11 as a mounting face to be attached to a tool body, an upper face 12 which opposes the bottom face 11, and which is made as a rake face, and a side face 13 which is formed between the bottom face 11 and the upper face 12, and which is made as a flank. The side face 13 inclines outwardly from the bottom face 11 to the upper face 12, and thus the throwaway insert 10 is made as a positive throwaway insert.

The side face 13, as a flank, comprises a first flank 13A disposed adjacent to the upper face 12 of the throwaway insert 10, and a second flank 13B which is connected to the first flank 13A via a stepped portion 13C, and which is disposed adjacent to the bottom face 11. The first flank 13A and the second flank 13B are in a substantially parallel relationship, and the second flank 13B is disposed inwardly with a step with respect to the first flank 13A.

The throwaway insert 10 further comprises a through hole 19 which extends from the center of the upper face 12 to the bottom face 11, and into which a screw for clamping the throwaway insert 10 is to be inserted. In the bottom face 11, there are formed two key grooves 18 which are located so as to have the through hole 19 therebetween, and which extend in the direction of width of the throwaway insert 10.

Along the side edge of the upper face 12 (i.e., the intersecting ridge between the upper face 12 and the side face 13), there are formed a pair of cutting edges 17 which are disposed diametrically with respect to the through hole 19, and each of which is formed substantially as an arc of a quarter circle in plan view. The cutting edges 17 are formed symmetrically about the center of the throwaway insert 10 so that the throwaway insert 10 can be used two times.

More specifically, in plan view, each of the pair of cutting edges 17 formed substantially as an arc of a quarter circle comprises an arc-shaped portion which forms a front portion of the cutting edge 17 while exhibiting an arc shape of a quarter circle, and which acts as a primary cutting edge for cutting a workpiece, and a straight portion which forms a rear portion of the cutting edge while exhibiting a substantially straight shape, and which is smoothly connected to the arc-shaped portion as a tangent thereto. Note that the front end of one cutting edge 17 coincides with the rear end of the other cutting edge 17, and vice versa.

On the upper face 12 and in the vicinity of two ends thereof in the longitudinal direction, there are formed two inclined surfaces 12A and 12B in such a manner that the distance between the bottom face 11 of the throwaway insert 10 and each of the inclined surfaces 12A and 12B gradually decreases as the distance from a corner portion 17A at the front end of one cutting edge 17 or from a corner portion 17B at the rear end of one cutting edge 17 decreases.

Because the inclined surfaces 12A and 12B are formed on the upper face 12, a front portion of the arc-shaped portion, which is the front portion of one of the cutting edges 17, is formed on the inclined surface 12A, and the straight portion, which is the rear portion of one of the cutting edges 17, is formed on the inclined surface 12B.

As a result, in one of the cutting edges 17, there are formed a first inclined cutting edge 17C which is located in the vicinity of the front corner portion 17A while exhibiting a substantially arc shape, and which is formed so as to gradually depart from the bottom face 11 as the distance form the corner portion 17A increases, and a second inclined cutting edge 17D which is located in the vicinity of the rear corner portion 17B while exhibiting a substantially straight shape, and which is formed so as to gradually depart from the bottom face 11 as the distance from the corner portion 17B increases.

The other of the cutting edges 17 is provided with another first inclined cutting edge 17C having a substantially arc shape and another second inclined cutting edge 17D having a substantially straight shape, and thus the other of the cutting edges 17 is configured similarly to one of the cutting edges 17.

In portions of the upper face 12 other than the inclined surfaces 12A and 12B, there are provided a plane surface 12C which is in parallel to the bottom face 11, and which surrounds the through hole 19 located at the center of the upper face 12, and undulating portions 16 which are disposed outside the plane surface 12C, i.e., in the vicinity of the pair of cutting edges 17 formed along the side edges of the upper face 12, and each of which comprises concave portions 14 and convex portions 15 that are alternately arranged at a substantially constant pitch.

In the undulating portions 16, each of the concave portions 14 and each of the convex portions 15 are respectively formed by curved surfaces while being smoothly connected to each other. Each of the concave portions 14 and each of the convex portions 15 extend in a direction substantially perpendicular to the cutting edge and in parallel to the bottom face 11 so as to intersect one of the pair of cutting edges 17 that are formed, in a substantially arc shape, on the side edges of the upper face 12. As a result, each of the cutting edges 17 exhibits a wavy shape formed by smooth curves in side view as shown in FIGS. 3 and 4 over substantially the entire length thereof except the first inclined cutting edge 17C and the second inclined cutting edge 17D.

The levels of the apexes of the convex portions 15 of the undulating portion 16 that intersect one of the cutting edges 17 are arranged to be the same with respect to each other, and the apexes of the convex portions 15 are disposed in substantially the same plane as the plane portion 12C of the upper face 12.

The levels the apexes of the concave portions 15 located at both ends of the cutting edge 17 are arranged slightly lower than that of the other concave portions 15 since the positions of these concave portions 15 correspond to the inclined surfaces 12A and 12B.

On the other hand, with regard to the concave portions 14 (for example, four concave portions in this embodiment) of the undulating portion 16 that intersect one of the cutting edges 17, at least one concave portion 14, specifically in this embodiment, two concave portions 14 are formed deeper that the other two concave portions 14. More specifically, the undulating portion 16 comprises alternately arranged deep-concave portions and shallow-concave portions, i.e., the undulating portion 16 comprises a first deep-concave portion 14A, a first shallow-concave portion 14B, a second deep-concave portion 14C, and a second shallow-concave portion 14D arranged in this order from the front corner portion 17A of one of the cutting edges 17.

The depth of the first shallow-concave portion 14B is set to be the same as that of the second shallow-concave portion 14D. On the other hand, the depth of the first deep-concave portion 14A is set to be different from that of the second deep-concave portion 14C, and more specifically, the second deep-concave portion 14C located farther from the corner portion 17A of one of the cutting edges 17 is formed deeper than the first deep-concave portion 14A.

The first deep-concave portion 14A and the second deep-concave portion 14C are located so as to evenly divide the quarter-circle portion (except the second inclined cutting edge 17D) of the cutting edge 17 into a plurality of portions (i.e., three portions in this case).

On the other hand, the undulating portions 16 of the other of the cutting edges 17 comprise another first deep-concave portion 14A, another first shallow-concave portion 14B, another second deep-concave portion 14C, and another second shallow-concave portion 14D arranged in this order from the front corner portion of the other of the cutting edges 17 (i.e., from the rear corner portion 17B of one of the cutting edges 17), and thus the undulating portions 16 are configured similarly to that of one of the cutting edges 17.

The upper face 12 is further provided with a breaker inclined surface 12D which inclines such that the distance from the bottom face 11 decreases as the distance from the plane surface 12C increases (toward the pair of cutting edges 17) to connect the plane surface 12C disposed around the through hole 19 to the inclined surfaces 12A and 12B and the undulating portions 16.

The breaker inclined surface 12D is connected to the inclined surfaces 12A and 12B and the undulating portions 16 before reaching the pair of cutting edges 17. With regard to the concave portions 14 of the undulating portions 16, the first deep-concave portion 14A and the second deep-concave portion 14C are made deeper than the first shallow-concave portion 14B and the second shallow-concave portion 14D; therefore, portions of the breaker inclined surface 12D, which are connected to the first deep-concave portion 14A and the second deep-concave portion 14C, extend farther toward the cutting edges 17 than portions of the breaker inclined surface 12D which are connected to the first shallow-concave portion 14B and the second shallow-concave portion 14D.

Moreover, in the first deep-concave portion 14A and the second deep-concave portion 14C, the first deep-concave portion 14A is made deeper than the second deep-concave portion 14C; therefore, a portion of the breaker inclined surface 12D, which is connected to the second deep-concave portion 14C (a portion of the breaker inclined surface 12D which is connected to the deep-concave portion that is located farther from the front corner portion 17A of the cutting edge 17 than the other deep-concave portion), extends farther toward the cutting edges 17 than a portion of the breaker inclined surface 12D which is connected to the first deep-concave portion 14A.

Here, the cutting edges 17, which exhibit wavy shape due to the concave portions 14 and the convex portions 15 of the undulating portions 16, will be explained in detail. As shown in FIG. 5, when viewing the cutting edge 17 in the direction along which the concave portions 14 and the convex portions 15 extend, while viewing the side face 13, i.e., as viewed in an imaginary diagram in which the substantially arc-shaped cutting edge 17 is deformed as a plane, the cutting edge 17 exhibits a wavy shape in which curves each having different radius of curvature are smoothly connected one after another.

Moreover, as shown in FIG. 5, among the concave portions 14 of the cutting edge 17, the depth HB of the first shallow-concave portion 14B, which is defined by a distance between apexes 15X of the convex portions 15 (the levels of the apexes 15X are arranged to be the same with respect to each other, and the apexes 15X are disposed in substantially the same plane as the plane portion 12C) and the bottom 14X of the concave portion 14 measured along the direction of thickness of the throwaway insert 10, i.e., along a direction perpendicular to the bottom face 11, is set to be substantially equal to the depth HD of the second shallow-concave portion 14D, and the depths HB and HD are preferably set in a range from 0.3 to 1.2 mm. In this embodiment, both of the depth HB of the first shallow-concave portion 14B and the depth HD of the second shallow-concave portion 14D are set to be 0.8 mm.

As is also shown in FIG. 5, among the concave portion 14 of the cutting edge 17, the depth HC of the second deep-concave portion 14C is set to be greater than the depth HA of the first deep-concave portion 14A, and the depths HA and HC are preferably set in a range from 1.2 to 3.0 mm. In this embodiment, the depth HA of the first deep-concave portion 14A is set to be 2.0 mm, and the depth HC of the second deep-concave portion 14C is set to be 2.4 mm.

As explained above, in the concave portions 14 of the cutting edge 17, the following relationships are satisfied among the depths of the concave portions 14: HB (the depth of the first shallow-concave portion 14B)=HD (the depth of the second shallow-concave portion 14D)<HA (the depth of the first deep-concave portion 14A)<HC (the depth of the second deep-concave portion 14C).

Moreover, as is also shown in FIG. 5, the distances P between the bottoms 14X of the concave portions 14 adjacent to each other at the cutting edge 17, i.e., pitches between the concave portions 14, are set to be substantially equal to each other, and are set to be in a range from 2.0 to 10.0 mm.

The distances between the apexes 15X of the convex portions 15 adjacent to each other at the cutting edge 17, i.e., pitches between the convex portions 15, are also set to be substantially equal to each other, and are set to be substantially equal to the distances P between the bottoms 14X of the concave portions 14 adjacent to each other. In addition, the distance between one of the bottoms 14X of the concave portions 14 and one of the apexes 15X of the convex portions 15 adjacent to each other, i.e., a pitch between one of the concave portions 14 and one of the convex portions 15 adjacent to each other, is also set to be substantially constant.

The throwaway insert 10 according to the present invention is configured as explained above. Next, an indexable type ball nose end mill provided with a plurality of throwaway inserts 10, specifically, a two-insert type ball nose end mill provided with two throwaway inserts 10 will be explained below with reference to FIGS. 6 to 8.

Figure 6:
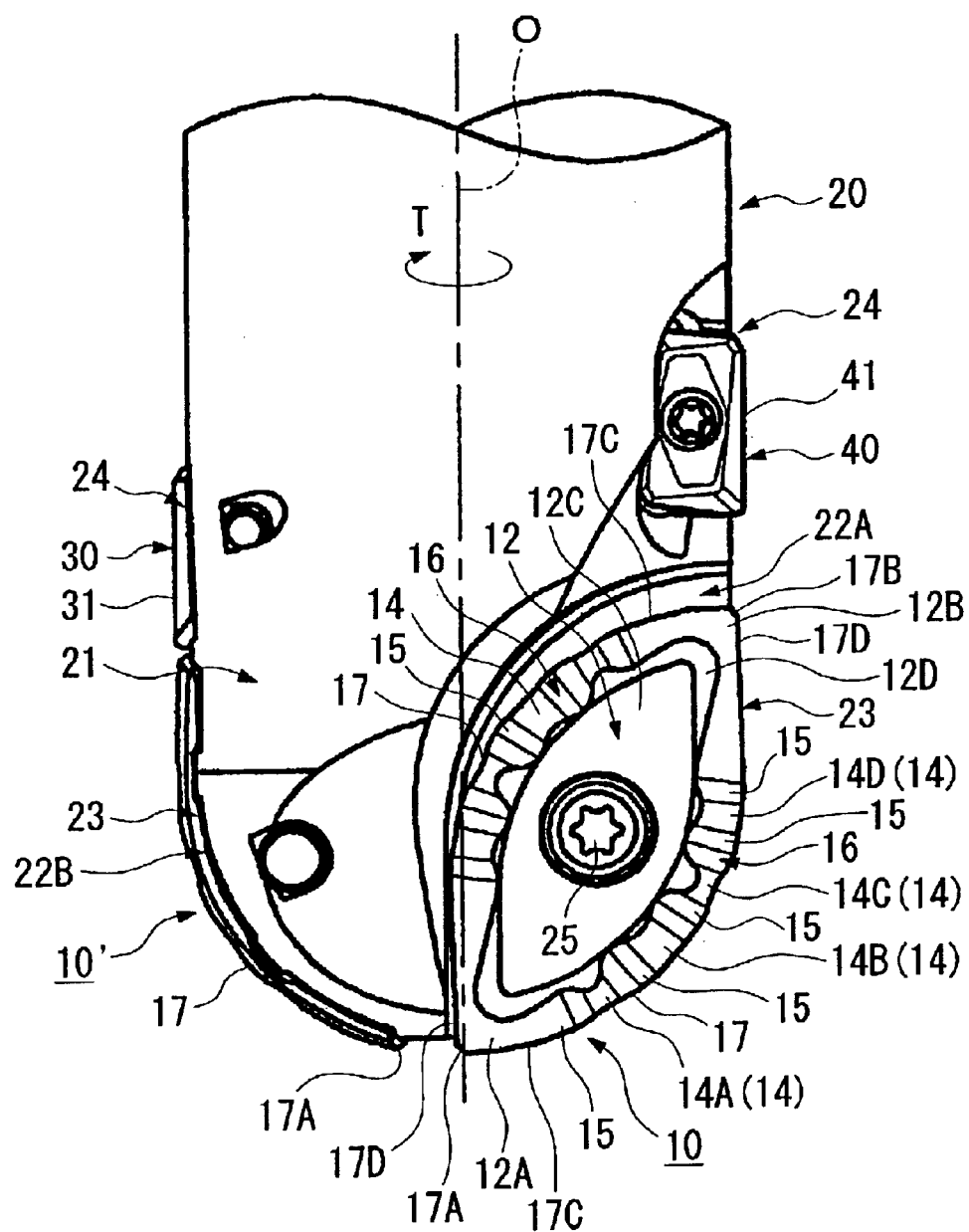
FIG. 6 is a plan view showing an indexable type ball nose end mill provided with the throwaway inserts of the embodiment.
Figure 7:
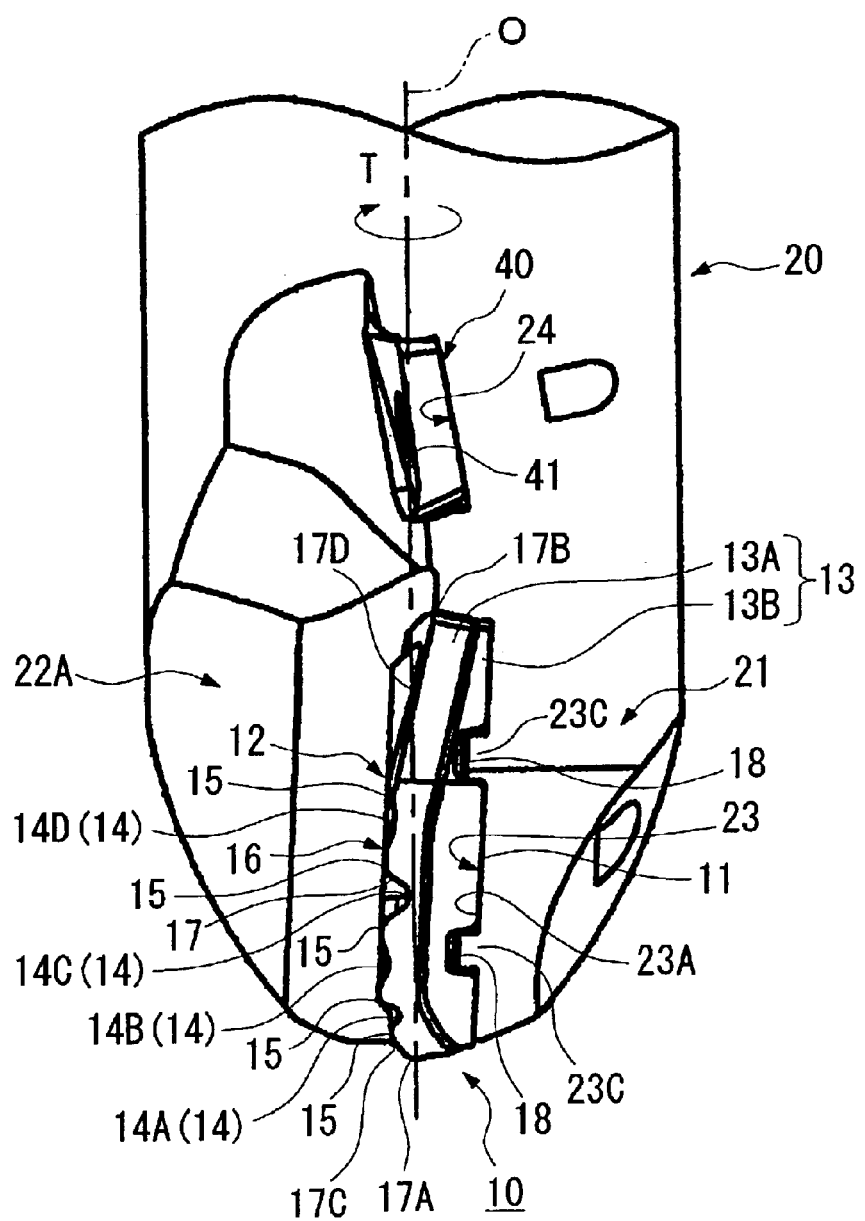
FIG. 7 is a side view showing the indexable type ball nose end mill provided with the throwaway inserts of the embodiment.
Figure 8:
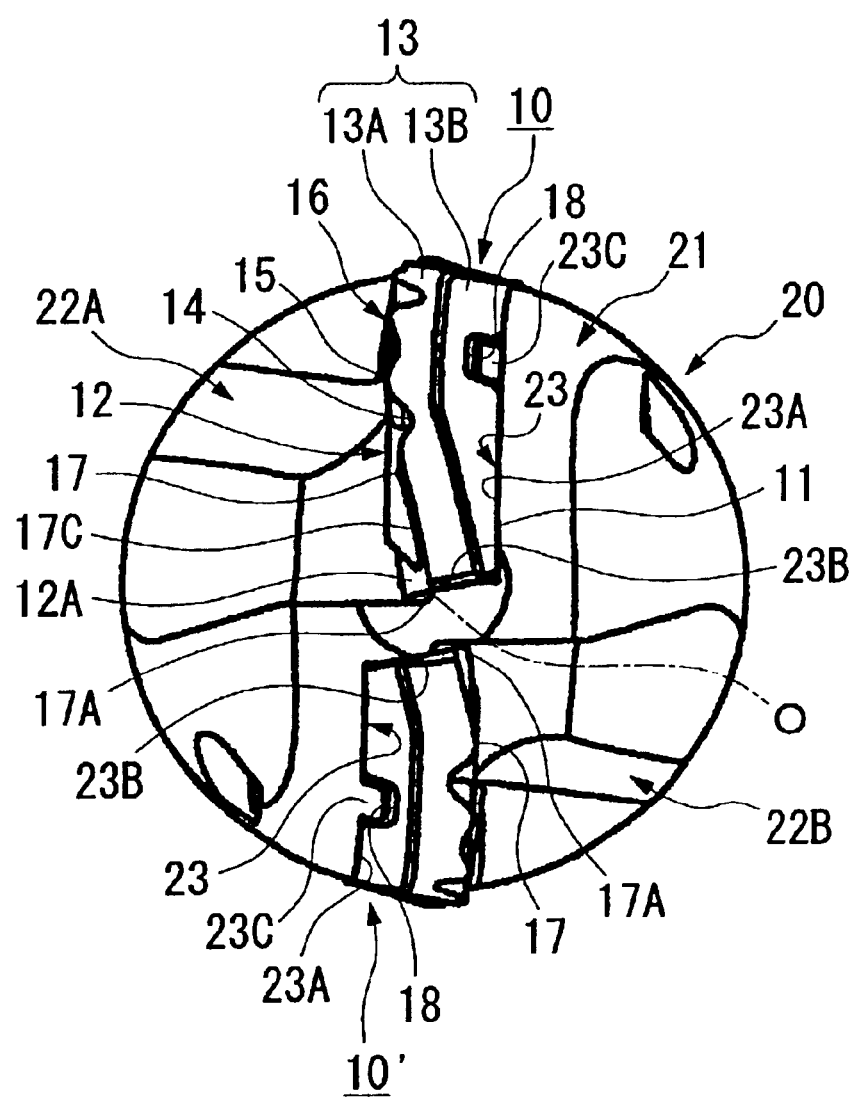
FIG. 8 is a tip view showing the indexable type ball nose end mill provided with the throwaway inserts of the embodiment.

FIG. 6 is a plan view showing the indexable type ball nose end mill provided with the throwaway inserts according to the embodiment of the present invention, FIG. 7 is a side view of the ball nose end mill, and FIG. 8 is a tip view of the ball nose end mill.

The indexable type ball nose end mill comprises a tool body 20 formed in a substantially cylindrical shape, which is rotatable about an axis O, and whose tip portion 21 is formed in a substantially hemispherical shape protruding along the axis O. As shown in FIG. 8 by tip view, the tip portion 21 is provided with a pair of insert pockets 22A and 22B each of which is formed by recessing the tip portion 21 at central angle of approximately 90°, and which are disposed diametrically about the axis O.

Each of the insert pockets 22A and 22B is provided with a first insert seat 23 on a wall thereof, which faces in the direction of tool rotation T, and which is located in the vicinity of the tip end of the tool body 20. Each of the insert pockets 22A and 22B is also provided with a second insert seat 24 at a portion closer to a proximal end of the tool body.

Each of the first insert seats 23, which are formed in insert pockets 22A and 22B, and which are located in the vicinity of the tip end of the tool body 20, is provided with a planar back face 23A which intersects the outer surface of the tip portion 21 while stepped back in the direction opposite to the direction of rotation T from the wall of the insert pocket 22A or 22B, and on which two keys 23C are formed, and a wall 23B which extends from the back face 23A.

Each of the back faces 23A of the first insert seats 23 is formed so as to incline in the direction opposite to the direction of rotation T as the distance from the proximal end of the tool body decreases.

The throwaway insert 10 of the present embodiment is attached to the distally located first insert seat 23 of the insert pocket 22A using a clamping screw 25 in such a manner that the upper face 12 thereof faces in the direction of rotation T, the first flank 13A of the side face 13 connected to one of the cutting edges 17 is abutted against the wall 23B, the tip corner portion 17A of the other of the cutting edges 17 is located on the axis O, from which the other of the cutting edges 17 extends outwardly and toward the proximal end of the tool body 20, and the rotational trace of the other of the cutting edges 17, i.e., the rotational trace of the outwardly disposed cutting edge 17 of the throwaway insert 10 about the axis O forms a substantially hemispherical shape.

Shifting of the throwaway insert 10 is prevented by the engagement of the keys 23C formed on the back face 23A of the first insert seat 23 with key grooves 18 formed in the throwaway insert 10.

When the throwaway insert 10 is attached to the tool body as described above, extended lines of the concave portions 14 and the convex portions 15, which are formed on the upper face 12 of the throwaway insert 10, and which are disposed adjacent to the outwardly disposed cutting edge 17, extend radially from the center of the hemisphere formed by the rotational trace of the outwardly disposed cutting edge 17.

The axial rake angle of the first inclined cutting edge 17C of the cutting edge 17 is set to a negative value, and the axial rake angle of the second inclined cutting edge 17D is set to a positive value.

Moreover, on the cutting edge 17, the axial rake angle of a portion between one of the convex portions 15 and one of the concave portions 14 disposed closer to the distal end of the tool body with respect to one of the convex portions 15 is set to a negative value, and the axial rake angle of a portion between one of the concave portions 14 and one of the convex portions 15 disposed closer to the proximal end of the tool body with respect to one of the concave portions 14 is set to a positive value. In other words, in the cutting edge 17 having an undulating shape, the axial rake angles are alternately set to negative values and positive values from the distal end of the tool body toward the proximal end thereof.

A throwaway insert 10', which is to be attached to the first insert seat 23 that is disposed in the other insert pocket 22B and in the vicinity of the distal end of the tool body 20, is formed in substantially the same shape as the throwaway insert 10 of the present embodiment except that the length thereof is slightly less than that of the throwaway insert 10 while maintaining the pitch in the undulating portion 16. In the following description, portions of the throwaway insert 10' equivalent to the corresponding portions of the throwaway insert 10 are provided with the same reference symbols, and explanation thereof will be omitted.

As shown in FIGS. 6 and 8, when the throwaway insert 10' is attached to the tool body 20, the tip corner portion 17A of the throwaway insert 10' is located slightly outwardly of the tip corner portion 17A of the throwaway insert 10 of the present embodiment, and from which the cutting edge 17 of the throwaway insert 10' extends outwardly and toward the proximal end of the tool body 20. The rotational trace of the cutting edge 17 of the throwaway insert 10' about the axis O and the rotational trace of the cutting edge 17 of the throwaway insert 10 of the present embodiment overlap each other.

When the tool body 20 is rotated with two throwaway inserts 10 and 10', the rotational traces of the concave portions 14 of the cutting edge 17 of the throwaway insert 10 about the axis O coincide with the rotational traces of the convex portions 15 of the cutting edge 17 of the throwaway insert 10' about the axis O, and the rotational traces of the convex portions 15 of the cutting edge 17 of the throwaway insert 10 about the axis O coincide with the rotational traces of the concave portions 14 of the cutting edge 17 of the throwaway insert 10' about the axis O.

The proximally located second insert seat 24 of one insert pocket 22B is provided with a quadrangular-plate shaped insert 30 in such a manner that the rotational trace of a substantially straight cutting edge 31 formed along the side edge of the upper face of the insert 30 and the rotational trace of the second inclined cutting edge 17D of the cutting edge 17 of the throwaway insert 10 attached on the first insert seat 23 of the insert pocket 22A overlap each other.

Moreover, the proximally located second insert seat 24 of the other insert pocket 22A is provided with a quadrangular-plate shaped insert 40 in such a manner that the rotational trace of a substantially straight cutting edge 41 formed along the side edge of the upper face of the insert 40 and the rotational trace of the cutting edge 31 of the insert 10 attached on the second insert seat 24 of the other insert pocket 22B overlap each other.

In the throwaway insert 10 configured as explained above, the undulating portion 16, formed by alternately arranged concave portions 14 and convex portions 15, is provided on the upper face 12, and the undulating portion 16 intersects the cutting edge 17 so as to provide a wavy-shaped cutting edge 17; therefore, the concave portions 14 and the convex portions 15 of the cutting edge begin to bite a workpiece at different times, and as a result, cutting force can be reduced.

In addition, because the concave portion 14 in the undulating portion 16 comprises the first shallow-concave portion 14B, the first deep-concave portion 14A that is made deeper than the second shallow-concave portion 14D, and the second deep-concave portion 14C, an effect of reduction in cutting force is obtained, and chips can be reliably separated.

As explained above, because the first deep-concave portion 14A and the second deep-concave portion 14C having relatively large depths are provided so that an effect of chip separation can be obtained, cut chips can be reliably separated by appropriately setting the depths of the first deep-concave portion 14A and the second deep-concave portion 14C even in a cutting state, such as in an "upward cutting manner", in which cut chips are not easily separated; therefore, the first shallow-concave portion 14B and the second shallow-concave portion 14D do not have to be made deep, and also because the concave portions 14 and the convex portions 15 are formed by curved surfaces, the strength of the cutting edge 17 can be sufficiently ensured.

In addition, because the concave portions 14 and the convex portions 15 extend in directions substantially perpendicular to the cutting edge 17 so as to intersect the cutting edge 17, stable undulation is provided over substantially the entire length of the cutting edge 17, and an effect of reduction in cutting force and an effect of chip separation can be stably obtained even when any portion of the wavy cutting edge 17 that is formed along the side edge of the upper face 12 actually contributes to cutting.

Moreover, because the first deep-concave portion 14A and the second deep-concave portion 14C are located at positions so as to substantially evenly divide a portion of the cutting edge 17 that actually contributes to cutting, i.e., the quarter-circle portion of the cutting edge 17, into three portions, the cut chips produced by the arc-shaped portion are substantially evenly divided into three, thereby superior chip dischargeability can be maintained.

In general, when a cutting edge like the cutting edge 17 of the throwaway insert 10 formed substantially as an arc of a quarter circle is used in a cutting operation, the chips produced by the cutting edge 17 are made gradually thicker, and thus it becomes difficult to make the chips separated, as the distance from the tip corner portion 17A of the cutting edge 17 due to feed in a direction perpendicular to the axis O of the tool body 20.

However, in the case of the present embodiment, the depth of the first deep-concave portion 14A is set to be different from that of the second deep-concave portion 14C, and more specifically, the second deep-concave portion 14C located farther from the corner portion 17A of one of the cutting edges 17 is formed deeper than the first deep-concave portion 14A, i.e., the second deep-concave portion 14C having greater depth is located at a position of the cutting edge 17 where thicker chips are produced, and the first deep-concave portion 14A having less depth than that of the second deep-concave portion 14C is located at a position of the cutting edge 17 where thinner chips are produced.

As a result, the first deep-concave portion 14A and the second deep-concave portion 14C, each having sufficient depth, are appropriately located corresponding to the thicknesses of the chips produced by the cutting edge 17 formed as an arc of a quarter circle, and thus the strength of the cutting edge can be ensured while maintaining an effect of chip separation.

If the depth HA of the first deep-concave portion 14A at the cutting edge 17 and the depth HC of the second deep-concave portion 14C at the cutting edge 17, as viewed in a direction along which the concave portions 14 and convex portions 15 extend, while viewing the side face 13, are not sufficient, i.e., the concave portions 14A and 14C are too shallow, an effect of chip separation due to the first deep-concave portion 14A and of the second deep-concave portion 14C may not be sufficiently obtained. On the other hand, if the depth HA of the first deep-concave portion 14A and the depth HC of the second deep-concave portion 14C are too large, the strength of the cutting edge 17, specifically in the vicinity of the first and second deep-concave portions 14A and 14C may be decreased.

Accordingly, in the present embodiment, the depths HA and HC of the first and second deep-concave portions 14A and 14C at the cutting edge 17 are preferably set in a range from 1.2 to 3.0 mm so that an effect of chip separation is stably obtainable without sacrificing the strength of the cutting edge.

More specifically, with regard to the first and second deep-concave portions 14A and 14C, the depth HA of the first deep-concave portion 14A is preferably set in a range from 1.2 to 2.4 mm, and the depth HC of the second deep-concave portion 14C is preferably set in a range from 1.8 to 3.0 mm.

If the depth HB of the first shallow-concave portion 14B at the cutting edge 17 and the depth HD of the second shallow-concave portion 14D at the cutting edge 17, as viewed in a direction along which the concave portions 14 and convex portions 15 extend, while viewing the side face 13, are not sufficient, i.e., the concave portions 14B and 14D are too shallow, an effect of reduction in cutting force due to the first shallow-concave portion 14B and of the second shallow-concave portion 14D may not be sufficiently obtained. On the other hand, if the depth HC of the first shallow-concave portion 14C and the depth HD of the second shallow-concave portion 14D are too large, the strength of the cutting edge 17 may be decreased.

Accordingly, in the present embodiment, the depths HB and HD of the first and shallow-concave portions 14B and 14D at the cutting edge 17 are preferably set in a range from 0.3 to 1.2 mm so that an effect of reduction in cutting force is stably obtainable without sacrificing the strength of the cutting edge.

If the distances P between the bottoms 14X of the concave portions 14 adjacent to each other at the cutting edge 17, as viewed in a direction along which the concave portions 14 and convex portions 15 extend, while viewing the side face 13, are too small, the cutting edge 17 exhibits a dense-wavy shape. On the other hand, if the distance P is too large, the cutting edge 17 exhibits a moderate-wavy shape. In either case, an effect of reduction in cutting force and an effect of chip separation may not be obtained.

Accordingly, in the present embodiment, the distance P is preferably set in a range from 2.0 to 10.0 mm so that an effect of reduction in cutting force and an effect of chip separation due to the wavy-shaped cutting edge 17 are stably obtainable.

In general, when a throwaway insert like the throwaway inserts 10 and 10', each of which is made as a positive insert in which the side face 13 inclines inwardly from the upper face 12 toward the bottom face 11, is used for a cutting operation, because the cutting edge 17 exhibits a moderate wavy shape when viewing the cutting edge 17 while facing the upper face 12, a machined surface of a workpiece may also have such a wavy shape.

In contrast, in the present embodiment, the throwaway inserts 10 and 10' are attached to the tool body 20 in such a manner that the rotational traces of the concave portions 14 of the cutting edge 17 of the throwaway insert 10 substantially coincide with the rotational traces of the convex portions 15 of the cutting edge 17 of the throwaway insert 10', and the rotational traces of the convex portions 15 of the cutting edge 17 of the throwaway insert 10 substantially coincide with the rotational traces of the concave portions 14 of the cutting edge 17 of the throwaway insert 10'.

Even though a machined surface, which is formed in a workpiece by being cut by the concave portions 14 and the convex portions 15 of the moderately undulate cutting edge 17 of the throwaway insert 10, temporarily exhibits a moderate wavy shape comprising concave portions and convex portions, the convex portions in the machined surface formed by the throwaway insert 10 are subsequently cut by the convex portions 15 of the cutting edge 17 of the other throwaway insert 10'; therefore, surface roughness of the machined surface in a workpiece may not be degraded.

In addition, because the inclined surfaces 12A and 12B are formed on the upper face 12, the first inclined cutting edge 17C is provided at the tip corner portion 17A of the cutting edge 17; therefore, the included angle of the tip portion of the cutting edge 17, to which a great cutting load is applied due to less peripheral speed, can be made large. Furthermore, because the undulating portion 16 is not formed on a portion of the upper face 12 where the thickness of the throwaway insert 10 is small due to the inclined surface 12A, rigidity of the throwaway insert 10 can be sufficiently ensured.

In this embodiment, the inclined surfaces 12A and 12B are provided in two portions arranged in the longitudinal direction on the upper face 12 of the throwaway insert 10; however, the inclined surfaces 12A and 12B do not have to be provided if the throwaway insert 10 can be made sufficiently thick.

Moreover, because portions of the breaker inclined surface 12D, which are connected to the first deep-concave portion 14A and the second deep-concave portion 14C, extend farther toward the cutting edges 17 than portions of the breaker inclined surface 12D which are connected to the first shallow-concave portion 14B and the second shallow-concave portion 14D, the cut chips produced by the first deep-concave portion 14A and by the second deep-concave portion 14C on the cutting edge 17, which act to separate chips, contact the breaker inclined surface 12D immediately after being produced; therefore, an effect of chip separation may be further enhanced.

Furthermore, in the throwaway insert 10 of the present embodiment, the first flank 13A and the second flank 13B, which together form the side face 13 as a flank, are connected to each other via the stepped portion 13C, and the second flank 13B is disposed inwardly with a step with respect to the first flank 13A so that just the first flank 13A is abutted against the wall 23B of the first insert seat 23 when the throwaway insert 10 is attached to the tool body 20.

As a result, because the second flank 13B on the side face 13 is not used to fix the throwaway insert 10 to the first insert seat 23, the accuracy of the second flank 13B is not so important, and the second flank 13B does not require polishing for surface finishing.

Accordingly, with regard to the side face 13, just the first flank 13A needs polishing for accurate surface finishing; therefore, the time for manufacturing the throwaway insert 10 can be greatly reduced.

In this embodiment, the concave portions 14 and the convex portions 15 in the undulating portion 16 are formed in parallel to the bottom face 11; however, the present invention is not limited to such a configuration, and the concave portions 14 and the convex portions 15 may be formed so as to incline toward the bottom face 11 as the distance from the cutting edge 17 increases, or alternatively, the concave portions 14 and the convex portions 15 may be formed so as to incline departing from the bottom face 11 as the distance from the cutting edge 17 increases.

For example, the concave portions 14 and the convex portions 15, which together form the undulating portion 16, may be formed so as to incline toward the bottom face 11 as the distance from the cutting edge 17 increases, and thus the cutting edge 17 may be provided with a positive rake angle, or alternatively, the concave portions 14 and the convex portions 15 may be formed so as to incline departing from the bottom face 11 as the distance from the cutting edge 17 increases, and thus the cutting edge 17 may be provided with a negative rake angle.

In these cases, the angle of inclination is preferably set in a range from −15° to 15° if the strength and ability to cut of the cutting edge are taken into account. Note that, with regard to the sign of an inclination angle, a positive sign means that a positive rake angle is provided to the cutting edge 17, and a negative sign means that a negative rake angle is provided to the cutting edge 17.

Moreover, the shapes of the concave portions 14 and the convex portions 15 in the undulating portion 16 are not limited to the wavy shape as in the above embodiment, and the shapes may be freely determined as long as an effect of reduction in cutting force and an effect of chip separation can be obtained due to the shape of the cutting edge 17 which enables asynchronous biting to a workpiece.

In the above embodiment, the throwaway insert 10 is formed in a substantially leaf shape, and comprises a pair of cutting edges 17; however, the throwaway insert 10 may comprise just one cutting edge 17.

Advantageous Effects Obtainable by the Invention

As explained above, according to the present invention, because the undulating portion, which is formed by alternately arranged concave portions and convex portions, is provided on the upper face of the throwaway insert so as to intersect the cutting edge, and the cutting edge has a wavy shape, the sections of the cutting edge respectively corresponding to the concave portions and the convex portions begin to bite a workpiece asynchronously, and as a result, cutting force is reduced.

In addition, because at least one of the concave portions is formed as a deep-concave portion which has a greater depth than that of the others, not only is a cutting force reduced, but also an effect of chip separation can be stably obtained due to the deep-concave portion. Because an effect of chip separation is obtainable due to the deep-concave portion, it is possible to ensure an effect of chip separation just by setting the depth of the deep-concave portion appropriately even when cutting is performed in a manner, e.g., an upward cutting manner, in which chips are not easily separated, while on the other hand, sufficient strength of the cutting edge is maintained since other concave portions do not have to be made deep.

What is claimed is:

1. A throwaway insert comprising:

a bottom face as a mounting face;

an upper face opposing the bottom face;

a side face formed between the bottom face and the upper face; and a cutting edge formed along an intersecting ridge between the upper face and the side face in a substantially arc shape such that the rotational trace of the cutting edge when being attached to a tool body in use substantially forms a partial spherical surface, wherein an undulating portion, which is formed by alternately arranged concave portions and convex portions, is provided on the upper face so as to intersect the cutting edge, and so as to provide a wavy shape to the cutting edge, wherein at least one of the concave portions is formed as a deep-concave portion which has a greater depth than that of the others, and wherein the depth of the deep-concave portion at the cutting edge, as viewed in a direction along which the concave portions and convex portions extend, while viewing the side face, is set in a range from 1.2 to 3.0 mm.

2. A throwaway insert according to claim 1, wherein the concave portions and the convex portions are formed by curved surfaces.

3. A throwaway insert according to claim 1, wherein each of the concave portions and each of the convex portions extend in a direction substantially perpendicular to the cutting edge so as to intersect the cutting edge.

4. A throwaway insert according to claim 1, wherein the deep-concave portion is located so as to divide a portion of the cutting edge, which actually contributes to cutting a workpiece, into a plurality of portions having lengths substantially equal to each other.

5. A throwaway insert according to claim 1 comprising a plurality of deep-concave portions, wherein the depths of the deep-concave portions are increased stepwise as the distance from a tip portion of the cutting edge increases.

6. A throwaway insert comprising:

a bottom face as a mounting face;

an upper face opposing the bottom face;

a side face formed between the bottom face and the upper face; and a cutting edge formed along an intersecting ridge between the upper face and the side face in a substantially arc shape such that the rotational trace of the cutting edge when being attached to a tool body in use substantially forms a partial spherical surface, wherein an undulating portion, which is formed by alternately arranged concave portions and convex portions, is provided on the upper face so as to intersect the cutting edge, and so as to provide a wavy shape to the cutting edge, wherein at least one of the concave portions is formed as a deep-concave portion which has a greater depth than that of the others, and wherein the depths of the concave portions at the cutting edge other than the deep-concave portion, as viewed in a direction along which the concave portions and convex portions extend, while viewing the side face, are set in a range from 0.3 to 1.2 mm.

7. A throwaway insert comprising:

a bottom face as a mounting face;

an upper face opposing the bottom face;

a side face formed between the bottom face and the upper face; and a cutting edge formed along an intersecting ridge between the upper face and the side face in a substantially arc shape such that the rotational trace of the cutting edge when being attached to a tool body in use substantially forms a partial spherical surface, wherein an undulating portion, which is formed by alternately arranged concave portions and convex portions, is provided on the upper face so as to intersect the cutting edge, and so as to provide a wavy shape to the cutting edge, wherein at least one of the concave portions is formed as a deep-concave portion which has a greater depth than that of the others, and wherein the distance between the bottoms of the concave portions adjacent to each other at the cutting edge, as viewed in a direction along which the concave portions and convex portions extend, while viewing the side face, is set in a range from 2.0 to 10.0 mm.

8. A throwaway insert according to claim 1, wherein the distances between the bottoms of the concave portions adjacent to each other at the cutting edge, as viewed in a direction along which the concave portions and convex portions extend, while viewing the side face, are set substantially to be equal to each other.

* * * * *